3,231,544
DIFUNCTIONAL AROMATIC HYDROCARBON RESINS
John D. Cotman, Jr., North Wilbraham, Irving Tashlick, Hampden, and Quirino A. Trementozzi, Springfield, Mass., assignors to Monsanto Company, St. Louis, Mo., a corporation of Delaware
No Drawing. Filed June 22, 1962, Ser. No. 204,614
9 Claims. (Cl. 260—67)

This invention relates to a novel class of aromatic hydrocarbon resins. More particularly, it relates to aromatic hydrocarbon resins containing functional terminal groups.

Aromatic hydrocarbon resins prepared by condensing aromatic hydrocarbons with aldehydes have been known for some time. Early work was done using mixtures of aromatic hydrocarbons, such as found in petroleum fractions, resulting in varnish-type products. More recently, work done using selected aromatic hydrocarbon compounds has resulted in solid, crystalline resins possessed of extremely high melting points. While these latter resins exhibit electrical grade properties, their use in such applications has been hindered by the difficulty with which they are fabricated. The more recent demand for materials capable of withstanding the high temperatures encountered in rocketry, etc., raises the question of how the thermal stability inherent in these resins can best be utilized in such high temperature applications.

It is, therefore, an object of this invention to provide polyfunctional aromatic hydrocarbon resins capable of reaction with other polyfunctional compounds to form higher polymers suitable as, e.g., laminating resins, in the manufacture of structures of high thermal stability.

Another object is the provision of polyfunctional aromatic hydrocarbon resins suitable per se for use as structural materials possessing high thermal stability.

Another object is the provision of polyfunctional aromatic hydrocarbon resins wherein the functionality is of various and diverse nature depending upon the particular properties sought and the intended application.

A further object is the provision of processes for the manufacture of such polyfunctional aromatic hydrocarbon resins.

These and other objects are attained by the provision of polyfunctional aromatic hydrocarbon resins of the following general structure:

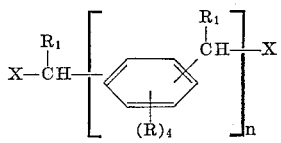

In this general structural formula each R is a radical independently selected from the class consisting of hydrogen and alkyl radicals containing from 1 to 4 carbon atoms, but at least two of said R groups must be alkyl. $R_1$ is a radical selected from the class consisting of hydrogen and hydrocarbon radicals containing from 1 to 6 carbon atoms and $n$ is an integer greater than 1. Each X represents a functional group. With respect to the nature of the functional groups, this invention is generic in nature and is not intended to be limited to the functional groups hereinafter set forth by way of example. The teachings herein contained are such that one skilled in the art shall, by adaptation of known processes and techniques, be able to prepare aromatic hydrocarbon resins containing functionality of various and diverse nature not herein specifically mentioned.

The characteristics of the polyfunctional aromatic hydrocarbon resins of this invention are largely dependent upon the degree of polymerization, $n$, of the resins. As a practical matter, since these polyfunctional aromatic hydrocarbon resins are obtained in more or less a mixture of degrees of polymerization, it is more accurate to consider the average degree of polymerization thereof, which may be determined by standard analytical tchniques. It has been observed that at average degrees of polymerization in excess of about 2, the melting points of these resins are directly proportional to their degree of polymerization. In general, it can be said that those polyfunctional aromatic hydrocarbon resins wherein the average degree of polymerization is less than about 5, the resins are of sufficiently low melting point as to be particularly suited for use as building blocks via the coreaction thereof with other polyfunctional compounds to form higher, thermally stable polymers. On the other hand, those polyfunctional aromatic hydrocarbon resins prepared using aromatic hydrocarbons containing 4 alkyl substituent groups, e.g., durene, and prehnitene and isodurene wherein the average degree of polymerization is above about 5, while similarly capable of coreaction with other polyfunctional compounds, are generally crystalline solids of extremely high melting point. Other polyfunctional aromatic hydrocarbon resins of high average degree of polymerization, but wherein the aromatic hydrocarbon structure contains but 2 or 3 alkyl substituents, possess melting points within a range falling between the fore-going extremes and are suitable either as coreactive building blocks to higher polymers or as molding powders.

The following examples are presented as illustrative of the inventive concept herein set forth and are not intended as limitations thereon.

Examples I–III, following, illustrate the preparation of polymeric diacetates using exemplary aromatic hydrocarbons in varying proportions with respect to the aldehyde employed and using various catalysts.

*Example I*

About 3.2 grams (ca. 0.5 molar proportion) of durene and 1.5 grams (ca. 1.0 molar proportion) of paraformaldehyde are dissolved in 60 ml. of glacial acetic acid containing about 2% by weight of sulfuric acid. This mixture is heated at reflux temperature for about 18 hours; polymeric material precipitating as the reaction proceeds. The reaction mixture is cooled to about room temperature yielding about 3.7 grams of a polymeric material which is identified by infrared and elemental analysis as a polymeric diacetate corresponding to the following structural formula:

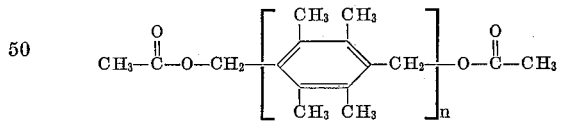

This polymeric diacetate is steeped, with stirring, in methanol at room temperature for about 20 minutes and then filtered. After drying, about 2.7 grams of a crystalline, methanol-insoluble, polymeric diacetate, melting at about 320° C. are obtained. The methanol filtrate is poured into a large excess of water, yielding, after drying, about 1.0 gram of a non-crystalline, methanol-soluble, polymeric diacetate, melting at about 162° C. Determination of the molecular weights of these two fractions by means of the saponification equivalent technique shows the average degree of polymerization ($n$) of the methanol-insoluble and the methanol-soluble fractions to be about 13.3 and 4.8, respectively. This data is summarized in Table A, following. The methanol-soluble fraction is found to be soluble in carbon disulfide, benzene, carbon tetrachloride and other halogenated solvents and aromatic solvents. The methanol-insoluble fraction is found to be soluble in hot benzyl benzoate, hot benzyl ether and hot alphachloro-naphthalene.

Example II

Example I is repeated using various proportions of durene to paraformaldehyde and several different catalysts; all as shown in Table A following. Also shown in Table A are the degrees of polymerization, melting points and relative proportions of the methanol-insoluble and methanol-soluble fractions obtained.

TABLE A

| | Molar Ratio (Durene/$CH_2O$) | Catalyst (Wt. Percent)[1] | Methanol Soluble Fraction | | | Methanol Insoluble Fraction | | |
|---|---|---|---|---|---|---|---|---|
| | | | Wt. Percent | $n$ | M.P., °C. | Wt. Percent | $n$ | M.P., °C. |
| Ex. I | 0.5 | $H_2SO_4$ (2%) | 27 | 4.8 | 162 | 73 | 13.3 | 320 |
| Ex. IIA | 1.0 | $H_2SO_4$ (2%) | | | | 100 | 15.0 | 338 |
| Ex. IIB | 0.25 | PTS[2] (1%) | 25 | 2.2 | 83 | 75 | 1.15 | 300 |
| Ex. IIC | 0.25 | PTS[2] (0.8%) | 25 | 2.3 | 79 | 75 | 11.6 | 295 |
| Ex. IID | 0.45 | PTS[2] (0.5%) | 41 | 2.1 | 83 | 59 | 9.6 | 325 |
| Ex. IIE | 0.2 | $BF_3$ (15%) | 12 | 1.8 | 127 | 88 | 8.3 | 255 |
| Ex. IIF | 1.0 | $H_3PO_4$ (10%) | | | | 100 | 32.0 | 392 |

[1] Wt. percent is based upon weight of glacial acetic acid.
[2] PTS = p-toluene sulfonic acid.

Example III

About 7 grams (ca. 1.0 molar proportion) of meta-xylene and about 2.25 grams (ca. 1.0 molar proportion) of paraformaldehyde are dissolved in 100 ml. of glacial acetic acid containing about 1% by weight of para-toluene sulfonic acid. This mixture is heated at reflux temperature for about 12 hours. The reaction mixture is cooled to about room temperature and then is slowly poured into about 150 ml. of methanol, precipitating a methanol-insoluble fraction which after filtration and drying is found to weigh about 2.6 grams. The filtrate is then poured into a large excess of water, yielding, after drying, about 3 grams of a methanol-soluble fraction. Both fractions are identified by infrared and elemental analysis as polymeric diacetates corresponding to the following structural formula:

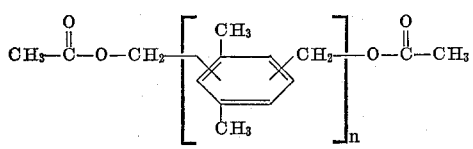

Determination of the molecular weights of the two fractions by means of the saponification equivalent technique shows the average degree of polymerization, $n$, of the methanol-insoluble and the methanol-soluble fractions to be about 44 and 3.0, respectively. The methanol-soluble fraction melts at about 75° C. whereas the methanol-insoluble fraction melts at temperatures about 115° C. Both fractions are found to be soluble in carbon tetrachloride, carbon disulfide, dioxane, methyl ethyl ketone and aromatic solvents.

The following Examples IV–VI illustrate the preparation of polymeric diesters other than the diacetates; the dibenzoates of Examples IV and V being prepared via an ester interchange reaction and the dibutyrate of Example VI being prepared directly.

Example IV

Five grams of a methanol-insoluble fraction of a polymeric diacetate prepared as in Example I ($n=13.3$) are added to 150 ml. of a xylene solution containing 3 grams of benzoic acid and 2% by weight of sulfuric acid. This reaction mixture is heated, with constant agitation, at reflux temperature until no further acetic acid comes off. The reaction mixture is cooled, poured into methanol and filtered, yielding a polymeric dibenzoate which is identified by infrared and elemental analysis as corresponding to the following structural formula:

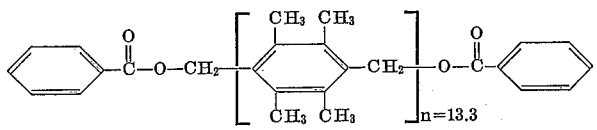

Example V

Example IV is repeated substituting the methanol-soluble fraction of a polymeric diacetate prepared as in Example III for the polymeric diacetate prepared therein. The polymeric dibenzoate obtained is identified by infrared and elemental analysis as corresponding to the following structural formula:

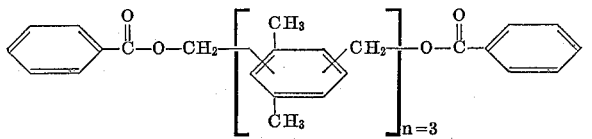

Example VI

Example I is repeated substituting butyric acid for the acetic acid employed therein. The polymeric dibutyrate obtained is identified by infrared and elemental analysis as corresponding to the following general formula:

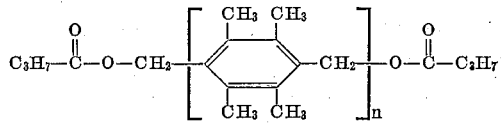

The following Examples VII–XIII illustrate the preparation of various other difunctional aromatic hydrocarbon resins.

Example VII

About 5 grams of the methanol-soluble fraction of a polymeric diacetate prepared as in Example I ($n=4.8$) are suspended in 200 ml. of a 10% by weight solution of potassium hydroxide in ethanol. This reaction mixture is heated at reflux temperature for about 3 hours. The reaction mixture is then cooled, poured into cold water and filtered, yielding, after drying, a polymeric glycol, in about 95% yield, which is identified by infrared and elemental analysis as corresponding to the following structural formula:

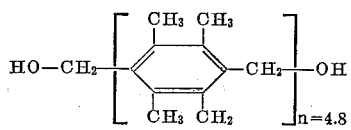

Example VIII

Example VII is repeated substituting the methanol-soluble fraction of a polymeric diacetate prepared as in Example III for the polymeric diacetate prepared therein. The polymeric glycol obtained is identified by infrared and elemental anailysis as corresponding to the following structural formula:

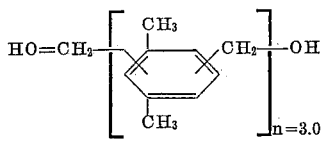

*Example IX*

Ten grams of a polymeric glycol prepared as in Example VII are dissolved in 100 ml. of dioxane. A mixture of 1.0 gram of potassium hydroxide and 2.1 grams of acrylonitrile is slowly added to this solution and the resulting reaction mixture is heated at reflux temperature for about 8 hours. The reaction mixture is then cooled, poured into cold water and filtered, yielding a polymeric dinitrile ether, in about 95% yield, which is identified by infrared and elemental analysis as corresponding to the following structural formula:

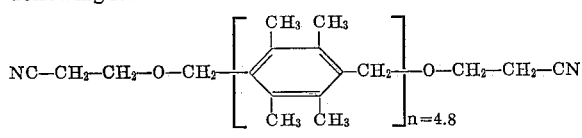

*Example X*

Ten grams of a polymeric dinitrile ether prepared as in Example IX are added to 250 ml. of a 10% by weight aqueous solution of sulfuric acid. The resulting reaction mixture is heated, with constant agitation, at reflux temperature for about 2 hours. The reaction mixture is then cooled and filtered, yielding a polymeric diacid ether, in about 90% yield, which is identified by infrared and elemental analysis as corresponding to the following structural formula:

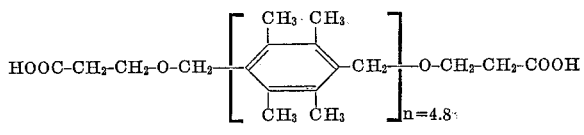

*Example XI*

Ten grams of a polymeric dinitrile ether prepared as in Example IX are dissolved in 100 ml. of acetic anhydride and 1.0 gram of platinum oxide is added. This mixture is placed under an atmosphere of hydrogen at a temperature of about 30° C. and is agitated until two equivalents of hydrogen have been absorbed. The resulting reaction mixture is then divided into two portions.

(a) One such portion is poured over ice forming a polymeric di(acetylamine) ether corresponding to the following structural formula:

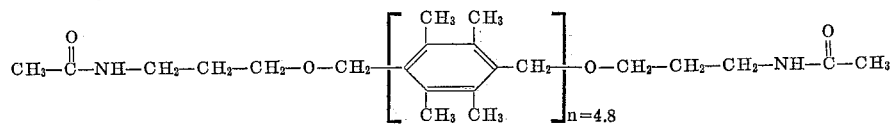

(b) The other portion is refluxed in an excess of ethanol containing 2% by weight of sodium hydroxide forming a polymeric diamine ether corresponding to the following structural formula:

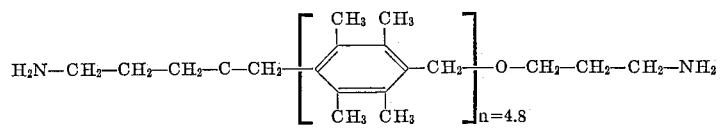

*Example XII*

Five grams of the ethanol-soluble fraction of a polymeric glycol prepared as in Example VII are added to 150 ml. of benzene. Maintaining the reaction system at about 50° C. with constant stirring, hydrogen chloride gas is bubbled through the system for about 2 hours. The reaction mixture is then cooled, poured into an excess of cold water and filtered, yielding, after evaporation of solvent and drying a polymeric dihalide which is identified by infrared and elemental analysis as corresponding to the general formula:

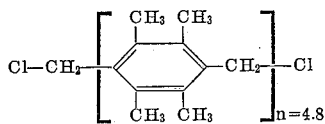

*Example XIII*

Five grams of the methanol-soluble fraction of a polymeric dihalide prepared as in Example XII are added to 150 ml. of methanol. Maintaining the reaction system at about 40° C. and with constant stirring, ammonia gas is bubbled through the system for about 2 hours. The reaction mixture is then cooled, poured into an excess of cold water and filtered, yielding, after drying, a polymeric diamine which is identified by infrared and elemental ananlysis as corresponding to the general formula:

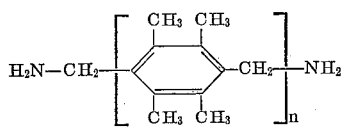

As heretofore set forth, the polyfunctional aromatic hydrocarbon resins of this invention correspond to the general formula:

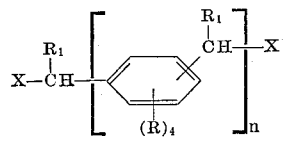

wherein R, $R_1$ and $n$ are as heretofore described and each X represents a functional group. As will be obvious to those skilled in the art, the possible functional groups are without limit. However, typical examples and the methods of their preparation are hereinafter presented without any intention to be limited to those which are specifically disclosed.

The central structures of these polyfunctional aromatic hydrocarbon resins are the result of the coreaction of an aromatic hydrocarbon and an aldehyde in the presence of a catalyst. While stoichiometric proportions of the aromatic hydrocarbon and aldehyde may be used, it is preferred to employ an excess of the aldehyde. It has been observed that, for a given catalyst, as the molar ratio of aldehyde to aromatic hydrocarbon is increased, the greater will be the proportion of low molecular weight polymer in the resulting polymer, thus providing some degree of control over the average molecular weight of the resulting polymer. Suitable catalysts which may be employed include mineral acids such as sulfuric acid, hydrocholric acid, nitric acid, phosphoric acid, etc., strong organic acids such as paratoluene sulfonic acid, etc., and acid salts such as boron trifluoride, etc. Manufacture of the polyfunctional resins of the present invention requires, of course, the presence of at least one more reactive component in this reaction mixture. However, the discussion relating to this third component, which provides the terminal functional groups, follows hereinafter in the discussion of the specific polyfunctional aromatic hydrocarbon resins which exemplify this invention.

The foregoing reaction, as well as the specific reactions hereinafter described are most advantageously effected in a liquid system with the resinous material either dissolved or suspended therein. Generally, this liquid will be inert to the reaction ensuing, but in certain instances such as the use of acetic acid as a media in the formation of diacetate resins or aqueous ammonium hydroxide as the media in the formation of diamine resins, this media may serve as the heretofore mentioned third reactive component. Conventional aromatic or halogenated hydrocarbon solvents readily dissolve the polyfunctional aromatic hydrocarbon resins of this invention which are either of relatively low average degree of polymerization or which contain less than 4 substituent alkyl groups in the aromatic hydrocarbon structure. However, even the high molecular weight, e.g., durene based resins of this invention are soluble in hot strong solvents such as benzyl benzoate, benzyl ether, alphachloro naphthalene, etc. On the other hand, however, the reactions herein discussed have been observed to be operable when the resinous material is merely suspended, either by simply agitating the system or through the use of a conventional suspending agent, in the liquid media; it merely being necessary to select liquid media which do not interfere with the particular reaction being effected.

The aromatic hydrocarbons employed in the practice of this invention may be any lower alkyl substituted benzene containing from 2 to 4 of such lower alkyl groups substituted on the aromatic ring. Therefore, examples of suitable aromatic hydrocarbons include ortho-, meta- and para-xylene, mesitylene, durene, prehnitene, isodurene, 1,3-diethyl benzene, 1,3-dimethyl-2,5-di-n-butyl benzene, etc.

The aldehydes employed in the practice of this invention correspond to the following general formula:

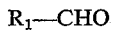

wherein $R_1$ is either hydrogen or a hydrocarbon radical containing from 1 to 6 carbon atoms. Exemplary of such aldehydes are formaldehyde and the various forms thereof such as paraformaldehyde, acetaldehyde, propionaldehyde, isobutyraldehyde, valeraldehyde, caproaldehyde, heptaldehyde, benzaldehyde, etc., and ethylenically unsaturated aldehydes such as acrolein, crotonaldehyde, etc.

In one embodiment, the polyfunctional aromatic hydrocarbon resins of this invention are diester resins corresponding to the general formula:

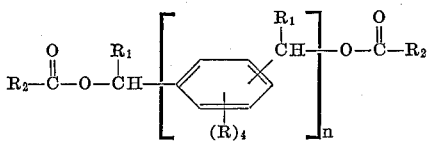

wherein R, $R_1$ and $n$ are heretofore described and $R_2$ is a hydrocarbon radical preferably containing from 1 to 20 carbon atoms. These resins are prepared by including as a third component, in the aforementioned reaction of the aromatic resin with the aldehyde, an organic acid corresponding to the general formula:

wherein $R_2$ is as above described. Such organic acid should be present in a stoichiometric proportion at least equivalent to the quantity of aromatic hydrocarbon employed and may, if desired, be used in the dual function of coreactant and reaction media. Reaction temperatures of from about 60° C. to reflux may be used. Exemplary of such organic acids are acetic acid, propionic acid, isobutyric acid, valeric acid, trimethylacetic acid, caproic acid, heptylic acid, caprylic acid, pelargonic acid, benzoic acid, etc., and saturated and unsaturated fatty acids such as lauric acid, palmitic acid, stearic acid, arachidic acid, palmitoleic acid, oleic acid, linoleic acid, linoleinic acid, etc. Mixtures of acids such as those derived from saturated and unsaturated oils, e.g., soya oil, linseed oil, etc., may be used.

If desired, a conventional ester interchange reaction may be employed to convert one diester to another by dissolving or suspending the first diester resin in the selected acid in the presence of a strong acid catalyst at elevated temperatures, e.g., 80° C. to reflux.

In another embodiment, the polyfunctional aromatic hydrocarbon resins of this invention are glycols corresponding to the general formula:

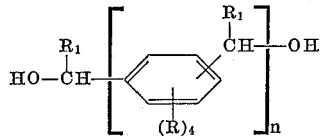

wherein R, $R_1$ and $n$ are as heretofore described. The simplest route to these glycol resins is via the hydrolysis of the aforementioned diester resins at temperature of from about 30° C. to reflux, using at least a stoichiometrically equivalent proportion of an alkali metal or alkaline earth hydroxide. With a view toward ease of recovery of the glycol, the hydrolysis may be effected by suspending the diester resin in an aqueous alkaline solution. However, the diester resin may be either dissolved or suspended in an inert liquid media such as ethanol, methanol, tetrahydrofuran, etc., containing either dissolved or suspended therein, one of the foregoing hydroxides. In such event, filtration and a water wash may be used to purify the glycol resin.

In another embodiment, the polyfunctional aromatic hydrocarbon resins of this invention are nitrile ethers corresponding to the general formula:

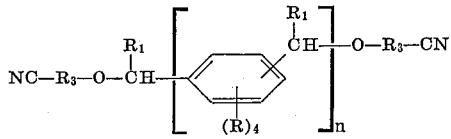

wherein R, $R_1$ and $n$ are as heretofore described and $R_3$ is a hydrocarbon radical preferably containing from 1 to 20 carbon atoms. These resins may be prepared by first forming the alkali metal salt of the desired glycol resin by refluxing the glycol resin in the presence of an alkali metal alkoxide, such as sodium methoxide in an, e.g., ether media, boiling off the volatile alcohol formed. The resulting resinous salt is then coreacted at a temperature of from about 30 to 100° C. in the same, e.g., ether, media with at least a stoichiometrically equivalent proportion of a dihalogenated hydrocarbon corresponding to the general formula:

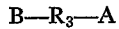

wherein $R_3$ is as above described and A and B are different halogens such as, e.g., chlorine and bromine. The more reactive halogen, A, will coreact with the glycol resin to form the structure:

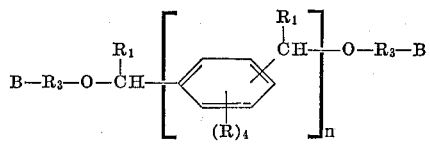

This intermediate is then coreacted at from about 40 to 100° C. in the same, e.g., ether, media with at least a stoichiometrically equivalent proportion of a cyanide salt, such as, e.g., sodium cyanide, to form the desired nitrile ether resin. This sequence of reactions may be effected in various inert liquid media, the resin being either dissolved or suspended therein. Examplary of such dihalogenated hydrocarbons are bromochloromethane, 1-bromo-2-chloro-ethane, 1-bromo-4-chloro-benzene, 1-bromo-4-chloro-butane, 1-iodo-4-bromo-naphthalene, 9-bromo-10-chloro-anthracene, etc.

Alternatively, nitrile ether resins in which $R_1$ has at least two carbon atoms may be prepared by coreacting at a temperature of from about 30 to 80° C., the desired glycol resin with an ethylenically unsaturated nitrile having the structure:

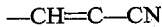

such as acrylonitrile, etc., in the presence of an alkaline catalyst and dissolved or suspended in an inert liquid media. Suitable alkaline catalysts include akali metal hydroxides, etc. The nitrile ether may be recovered by adding an excess of water to precipitate any soluble resin, followed by filtration and washing with water.

In another embodiment, the polyfunctional aromatic hydrocarbon resins of this invention are acid ethers corresponding to the general formula:

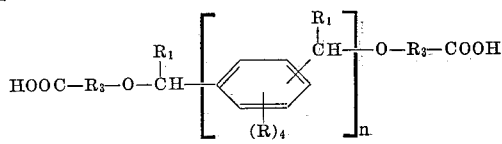

wherein $R$, $R_1$, and $R_3$ and $n$ are as heretofore described. These resins may be prepared by hydrolyzing the desired nitrile ethers suspended in aqueous media in the presence of a strong base or a mineral acid. Thus, dilute aqueous solutions of sulfuric acid, hydrochloric acid, sodium hydroxide, etc., may be used. Such hydrolysis may be effected at temperature of from about 60 to 110° C. These acid ethers may be esterified with organic acids corresponding to the general formula:

$$R_2-COOH$$

as heretofore described.

In another embodiment, the polyfunctional aromatic hydrocarbon resins of this invention are amine ethers corresponding to the general formula:

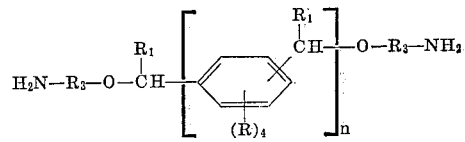

wherein $R$, $R_1$, $R_3$ and $n$ are as heretofore described. These resins may be prepared by coreacting the desired nitrile ether with at least 2 stoichiometrically equivalent proportions of lithium aluminum hydride at a temperature of from about 30 to 65° C. An inert liquid media, e.g., ether, tetrahydrofuran, etc., is used, the resinous material being dissolved or suspended therein.

Alternatively, these amine ethers may be prepared by coreacting the desired nitrile ether with hydrogen at temperatures of from about 20 to 40° C. in the presence of a platinum oxide catalyst, followed by hydrolysis of the intermediate formed in alcohol or water at reflux temperatures in the presence of an acid or basic catalyst. Again, these reactions are effected with the resinous material dissolved or suspended in an inert liquid media.

In another embodiment, the plyfunctional aromatic hydrocarbon resins of this invention are halides corresponding to the general formula:

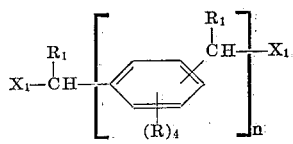

wherein $R$, $R_1$ and $n$ are as heretofore described and $X_1$ is a halogen, i.e., chlorine, bromine, flourine, iodine. These resins may be prepared by dissolving or suspending the desired glycol resin in, e.g., benzene, ether, hydrocarbon solvent, water, etc., and passing a stream of gaseous hydrogen halide, e.g., hydrogen chloride, hydrogen bromide, etc., through the system. This recation may be effected at temperatures of from about 50 to 125° C.

In another embodiment, the polyfunctional aromatic hydrocarbon resins of this invention are amines corresponding to the general formula:

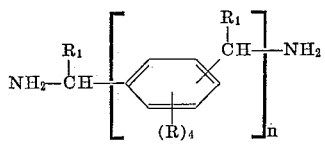

wherein $R$, $R_1$ and $n$ are as heretofore described. These resins may be prepared by suspending the desired halide resin in, e.g., aqueous ammonium hydroxide, liquid ammonia, etc., at ambient temperature or by bubbling gaseous ammonia through a solution or suspension of the desired halide resin in, e.g., methanol, benzene, etc., at from about room temperature to 80° C.

The foregoing are merely exemplary of the range and diversity of the polyfunctional aromatic hydrocarbon resins of this invention. It should be obvious to one skilled in the art that other known processes and techniques may be used to prepare a virtually limitless range of polyfunctional aromatic hydrocarbon resins, not herein specifically set forth, using the several polyfunctional resins described as intermediates or by selecting proper third components in the coreaction of the aromatic hydrocarbon and the aldehyde. Other polyfunctional aromatic hydrocarbon resins within the scope of this invention include, for example, those in which the functionality, X, is

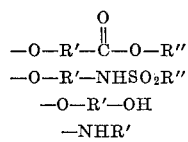

wherein $R'$ and $R''$ are hydrocarbon radicals,

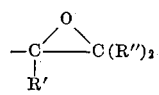

wherein $R'$ and $R''$ may be hydrogen or hydrocarbon radicals, and

—CHO
—COOH
—CNO
—SH
—P(Halogen)$_2$
—SO$_3$H etc.

As heretofore stated, the polyfunctional aromatic hydrocarbon resins of this invention are generally obtained in a mixture of molecular weights, i.e., degrees of polymerization, which can be separated, at least to some degree, by their differential solubility in various solvents. In this discussion, only two fractions, i.e., methanol-solubles and methanol-insolubles, have been discussed.

The polyfunctional aromatic hydrocarbon resins of this invention have been observed to be essentially linear in nature. However, when the aromatic hydrocarbon employed contains less than 4 alkyl substituent groups it is possible, under vigorous conditions of coreacting the aromatic hydrocarbon and the aldehyde, to effect some branching through attachment of a third aldehyde group to the aromatic structure. However, in general, when linear polymers are sought, such branching should be held to a minimum so as to prevent substantial crosslinking. The polyfunctional resins described in the foregoing examples have been observed to be substantially linear in nature with only limited amounts of such branching.

The polyfunctional aromatic hydrocarbon resins of this invention, particularly those of lower molecular weight, find their greatest utility as components for coreaction with other polyfunctional compounds to provide higher polymers of superior thermal stability. For example, the glycol resins of this invention can be used as the polyhydric component in the formation of rigid, thermally stable polyester resins. Similarly, the appropriate polyfunctional resins of this invention can be used as components in the formulation of novel polyamide resins, polyisocyanate resins, polyurethane, polyethers, etc. Many structural, laminating, coating, etc., applications are available to such resins.

These polyfunctional aromatic hydrocarbon resins, particularly those of intermediate average degree of polymerization, e.g., $n=5$ to $45$, when converted to higher molecular weight resins by reaction or coreaction are suitable for use as molding powders, fibers, films, etc. When coreacted with functional monomers, e.g., maleic anhydride, allyl alcohol, etc., the resulting prepolymers would be useful as thermosetting resins for laminates, coatings, adhesives, etc.

Various conventional additives such as fillers, dyes, pigments, stabilizers, plasticizers, etc., may be added to and incorporated into the polyfunctional aromatic hydrocarbon resins of this invention.

It is obvious that many variations may be made in the products and processes of this invention without departing from the spirit and scope thereof.

What is claimed is:

1. Difunctional aromatic hydrocarbon resins consisting essentially of compositions of the general formula:

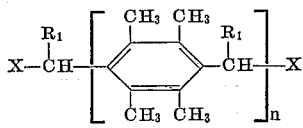

wherein each X is a functional group, each $R_1$ is a radical selected from the class consisting of hydrogen and hydrocarbon radicals free of ethylenic unsaturation containing from 1 to 6 carbon atoms and $n$ is an integer greater than 1.

2. Difunctional aromatic hydrocarbon resins consisting essentially of compositions of the general formula:

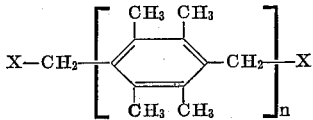

wherein each X is a functional group and $n$ is an integer greater than 1.

3. Difunctional aromatic hydrocarbon resins consisting essentially of compositions of the general formula:

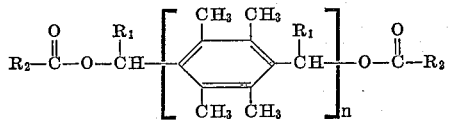

wherein each $R_2$ is a hydrocarbon radical free of ethylenic unsaturation containing from 1 to 20 carbon atoms, each $R_1$ is a radical selected from the class consisting of hydrogen and hydrocarbon radicals free of ethylenic unsaturation containing from 1–6 carbon atoms and $n$ is an integer greater than 1.

4. Difunctional aromatic hydrocarbon resins consisting essentially of compositions of the general formula:

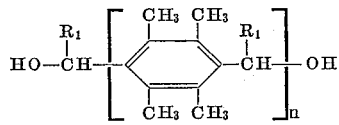

wherein each $R_1$ is a radical selected from the class consisting of hydrogen and hydrocarbon radicals free of ethylenic unsaturation containing from 1 to 6 carbon atoms and $n$ is an integer greater than 1.

5. Difunctional aromatic hydrocarbon resins consisting essentially of compositions of the general formula:

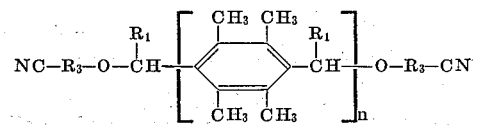

wherein each $R_3$ is a hydrocarbon radical free of ethylenic unsaturation containing from 1 to 20 carbon atoms, each $R_1$ is a radical selected from the class consisting of hydrogen and hydrocarbon radicals free from ethylenic unsaturation containing from 1 to 6 carbon atoms and $n$ is an integer greater than 1.

6. Difunctional aromatic hydrocarbon resins consisting essentially of compositions of the general formula:

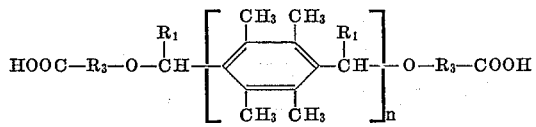

wherein each $R_3$ as a hydrocarbon radical free of ethylenic unsaturation containing from 1 to 20 carbon atoms, each $R_1$ is a radical selected from the class consisting of hydrogen and hydrocarbon radicals free of ethylenic unsaturation containing from 1 to 6 carbon atoms and $n$ is an integer greater than 1.

7. Difunctional aromatic hydrocarbon resins consisting essentially of compositions of the general formula:

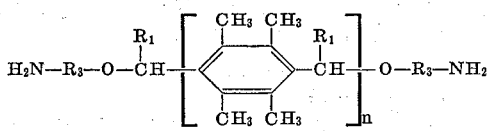

wherein each $R_3$ is a hydrocarbon radical free of ethylenic unsaturation containing from 1 to 20 carbon atoms, each $R_1$ is a radical selected from the class consisting of hydrogen and hydrocarobn radicals free of ethylenic unsaturation containing from 1 to 6 carbon atoms and $n$ is an integer greater than 1.

8. Difunctional aromatic hydrocarbon resins consisting essentially of compositions of the general formula:

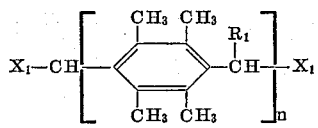

wherein each $X_1$ is a halogen, each $R_1$ is a radical selected from the class consisting of hydrogen and hydrocarbon radicals free of ethylenic unsaturation containing from 1 to 6 carbon atoms and $n$ is an integer greater than 1.

9. Difuctional aromatic hydrocarbon resins consisting essentially of compositions of the general formula:

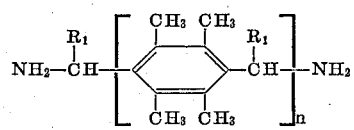

wherein each $R_1$ is a radical selected from the class consisting of hydrogen and hydrocarbon radicals free of ethylenic unsaturation containing from 1 to 6 carbon atoms and $n$ is an integer greater than 1.

References Cited by the Examiner

UNITED STATES PATENTS

| | | | |
|---|---|---|---|
| 2,957,851 | 10/1960 | Fetterly | 260—67 |
| 2,985,615 | 5/1961 | Tunteler | 260—67 |

FOREIGN PATENTS 588,082 12/1959 Canada.

WILLIAM H. SHORT, *Primary Examiner.*

J. R. LIBERMAN, *Examiner.*